(12) United States Patent
Nakamura et al.

(10) Patent No.: US 7,724,463 B2
(45) Date of Patent: May 25, 2010

(54) DISK DRIVE DEVICE AND METHOD FOR REMOVING ADHESION ON A HEAD

(75) Inventors: Taichi Nakamura, Kanagawa (JP);
Mitsuhiko Oguchi, Kanagawa (JP);
Yasunori Kawamoto, Kanagawa (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 12/220,719

(22) Filed: Jul. 25, 2008

(65) Prior Publication Data

US 2009/0040659 A1    Feb. 12, 2009

(30) Foreign Application Priority Data

Jul. 27, 2007    (JP)    ............................ 2007-196660

(51) Int. Cl.
*G11B 21/02*    (2006.01)
(52) U.S. Cl. ........................................................ 360/75
(58) Field of Classification Search ................. None
See application file for complete search history.

(56) References Cited

U.S. PATENT DOCUMENTS 5,436,776 A    7/1995    Kurakawa
6,493,184 B1    12/2002    Smith
6,577,575 B2 *    6/2003    Novotny et al. ................ 369/71
6,853,508 B2 *    2/2005    Smith et al. .................... 360/31

FOREIGN PATENT DOCUMENTS

JP    08-279120 A    10/1996
JP    2003-109340 A    4/2003

* cited by examiner

*Primary Examiner*—K. Wong
(74) *Attorney, Agent, or Firm*—Townsend and Townsend and Crew LLP; John Henkhaus (57) ABSTRACT

Embodiments of the present invention help to effectively remove adhesion on a head slider. In an embodiment of the present invention, a hard disk controller/multiprocessing unit (HDC/MPU) raises the temperature on the surface of a head slider with a heating element on the head slider to remove adhesion on the head slider while an actuator stays on a ramp. The HDC/MPU varies the amount of heat in accordance with the temperature sensed by a temperature sensor. This achieves removal of the adhesion on the head slider, maintaining reliability.

18 Claims, 6 Drawing Sheets

HEAT AMOUNT TABLE

| SENSED TEMPERATURE | HEATER POWER | ENERGIZING TIME |
|---|---|---|
| ~X1 | Y1 | T1 |
| X2~X3 | Y2 | T2 |
| X4~X5 | Y3 | T3 |
| X6~ | Y4 | T4 |

ROTATION

Fig. 6(b)

ROTATION

Fig. 6(c)

ROTATION

Fig. 6(d)

ROTATION

DISK DRIVE DEVICE AND METHOD FOR REMOVING ADHESION ON A HEAD

CROSS-REFERENCE TO RELATED APPLICATION

The instant nonprovisional patent application claims priority to Japanese Patent Application No. 2007-196660 filed Jul. 27, 2007 and which is incorporated by reference in its entirety herein for all purposes.

BACKGROUND OF THE INVENTION

Disk drive devices using various kinds of disks, such as optical disks, magneto-optical disks, flexible magnetic disks and the like have been known in the art. In particular, hard disk drives (HDDs) have been widely used as storage devices of computers and have been one of indispensable storage devices for current computer systems. Moreover, the HDDs have found widespread application to moving image recording/reproducing apparatuses, car navigation systems, cellular phones, and the like, in addition to the computers, due to their outstanding characteristics.

A magnetic disk used in an HDD has multiple concentric data tracks and multiple servo tracks recorded discretely in the circumferential direction. Each data track includes multiple data sectors containing user data. Servo data have address information. A head element portion of a head slider supported by a swinging actuator accesses a desired data sector in accordance with address information in servo data to write data to and retrieve data from the data sector.

A head slider flies above a rotating magnetic disk. Contaminants deposited on the air bearing surface (ABS) of the head slider may cause data loss such as a write fault or an unreadable error. These errors seem to be partly caused by higher fly-height of the head slider due to the adhesion on the ABS or an enormous variation in the head fly-height because of contact of the head slider with the magnetic disk through the adhesion.

The above-described contaminants are mainly organic materials. Organic materials vaporizing from the components packaged in an enclosure may condense to deposit on the ABS, or may condense to deposit on the magnetic disk and then adhere to the ABS of the head slider flying over the magnetic disk. Certain components may be the origin of the organic materials. For example, in winding a VCM coil of the actuator, wax is coated on a copper wire so that a short circuit will not be brought up resulting from an enamel coating of the copper wire being peeled off. The adherent wax remains on the VCM coil in the HDD. The wax vaporizes at high temperature or due to the heat generated by the VCM coil during a seek operation.

For another example, organic materials vaporizes from resin components such as a ramp or adhesives at operational temperature of an HDD and deposit onto the surface of the magnetic disk when the temperature drops during non-operation. The head slider flying above the rotating magnetic disk gradually gathers organic materials dispersed on the magnetic disk onto its ABS. If the adhesion on the ABS increases, the head fly-height may increase, or the adhesion may fill the clearance between the head slider and the magnetic disk at some timing and the head slider may contact the magnetic disk through the adhesion, resulting in that the head slider rides on the adhesion to increase the fly-height. These seem to cause data loss such as a write fault and an unreadable error.

So far, a technique has been proposed that removes the adhesion on the ABS (for example, refer to a Japanese Patent Publication No. 8-279120 "Patent Document 1"). The head slider according to this conventional technique comprises a heater element and the heat by the heater element vaporizes lubricant on the ABS. This prevents an adsorption phenomenon between the head slider and the magnetic disk due to the lubricant on the ABS.

The above related art document indicates that, in an HDD employing the contact start and stop (CSS) scheme, feeding electric current across a heating element immediately after a stop of the disk effectively prevents the adsorption phenomenon. However, when the head slider is in contact with the magnetic disk, it is difficult to remove the adhesion on the head slider by vaporizing it completely using the heating element. Similarly, while the head slider is flying above the magnetic disk, it is difficult to remove the adhesion on the head slider by vaporizing it completely using the heating element, too.

This is because, if the head slider is in contact with the magnetic disk or it is flying several nanometers above the magnetic disk with high pressure air present between the head slider and the magnetic disk, the heat on the surface of the head slider is conducted to the magnetic disk so that it is necessary to supply the head slider with a large amount of heat to raise the temperature on the surface of the head slider high enough.

As seen from the above, it is important to effectively raise the temperature on the surface of the head slider to remove the adhesion on the head slider. On the other hand, it is important to consider the reliability of the head slider. Temperatures exceeding a specific value will cause element destruction in the head element portion on the head slider. Especially, due to a tendency toward higher recording density and smaller head element portion, the thermotolerance of the head element portion decreases more than ever. Accordingly, it is important that the temperature of the head element portion should not rise too high when removing the adhesion on the head slider.

BRIEF SUMMARY OF THE INVENTION

Embodiments of the present invention provide an effective method for removing adhesion on a head slider. According to the embodiment of FIG. 3, a hard disk controller/multiprocessing unit (HDC/MPU) 23 raises the temperature on the surface of a head slider 12 with a heating element on the head slider 12, to remove adhesion on the head slider 12 while an actuator 16 stays on a ramp 17. The HDC/MPU 23 varies the amount of heat in accordance with the temperature sensed by a temperature sensor 18. This achieves removal of the adhesion on the head slider, maintaining reliability.

DETAILED DESCRIPTION OF THE INVENTION

Embodiments of the present invention relate to a disk drive device and a method for removing adhesion on a head, more particularly to removal of adhesion on a head using a heating element of the head.

A disk drive device according to an aspect of embodiments of the present invention comprises a disk for storing data, a head having a reproducing element, a recording element, and a heating element, a moving mechanism for supporting and moving the head, a ramp onto which the moving mechanism is withdrawn, and a controller for controlling the heating element to heat the head when the moving mechanism stays on the ramp in accordance with a heating condition or conditions of the head determined depending on condition of the head. Determination of heating conditions depending on condition of the head and heating the head with the heating element on the head when the moving mechanism is on the ramp accomplish effective removal of adhesion on the head.

In one example, the condition of the head includes an error status determined based on an error log on the head, and the heating condition or conditions include a heating timing and/or the amount of heat to the head. This accomplishes an appropriate timing and/or temperature for heating the head.

In one example, the condition of the head includes elapsed time after a previous heating of the head positioned on the ramp, and the heating condition or conditions include a heating timing to the head. This accomplishes an appropriate timing for heating the head.

In one example, the condition of the head includes the temperature of the head, and the heating condition or conditions include the amount of heat to the head. This accomplishes an appropriate temperature to which the head is heated.

In one example, the moving mechanism supports multiple heads aligned in the direction parallel to a rotational shaft of the disk, the condition of each head includes an alignment position of the head, and the heating condition or conditions include a heating timing and/or the amount of heat to the head. This accomplishes an appropriate timing for heating the head depending on the head.

The controller may control the heating element to heat the head while the disk is rotating. This accomplishes more effective removal of adhesion on the head. In an example, the condition of the head includes rotation of the disk, and the heating condition or conditions include the amount of heat to the head. This accomplishes an appropriate temperature to which the head is heated.

The controller may control the heating element to adjust the clearance between the head and the disk. Utilizing the heating element used for clearance adjustment accomplishes effective control of heating operation of the head.

In one example, the controller controls the heated head to be loaded above the disk with the moving mechanism and to transfer adhesion on the head onto the disk. This accomplishes effective removal of adhesion on the head.

Another aspect of embodiments of the present invention is a method for removing adhesion on a head in a disk drive device employing the load/unload scheme. This method determines a heating condition or conditions of the head depending on condition of the head, and heats the head with a heating element on the head in accordance with the heating condition or conditions when a moving mechanism for supporting and moving the head stays on a ramp. Determination of heating conditions depending on condition of the head and heating the head with the heating element on the head when the moving mechanism is on the ramp accomplish effective removal of adhesion on the head.

According to embodiments of the present invention, adhesion on a head can be removed effectively.

Hereinafter, particular embodiments of the present invention will be described. For clarity of explanation, the following description and the accompanying drawings contain omissions and simplifications as appropriate. Throughout the drawings, the like components are denoted by like reference numerals, and their repetitive description is omitted for clarity of explanation if not necessary. Hereinafter, descriptions will be given to a hard disk drive (HDD) as an example of a disk drive device. The HDD according to the embodiments raises the temperature on the surface of a head slider with a heating element on the head slider to remove adhesion on the head slider while an actuator is positioned on a ramp.

The HDD according to one embodiment raises the temperature on the surface of a head slider with a heating element on the head slider to remove adhesion on the head slider while an actuator is positioned on a ramp. This is because it is possible to heat the head slider above the ramp more efficiently than above the disk since the head slider is positioned sufficiently away from the ramp having low heat conductivity so that influence of thermal conductance can be neglected.

Figure 1:
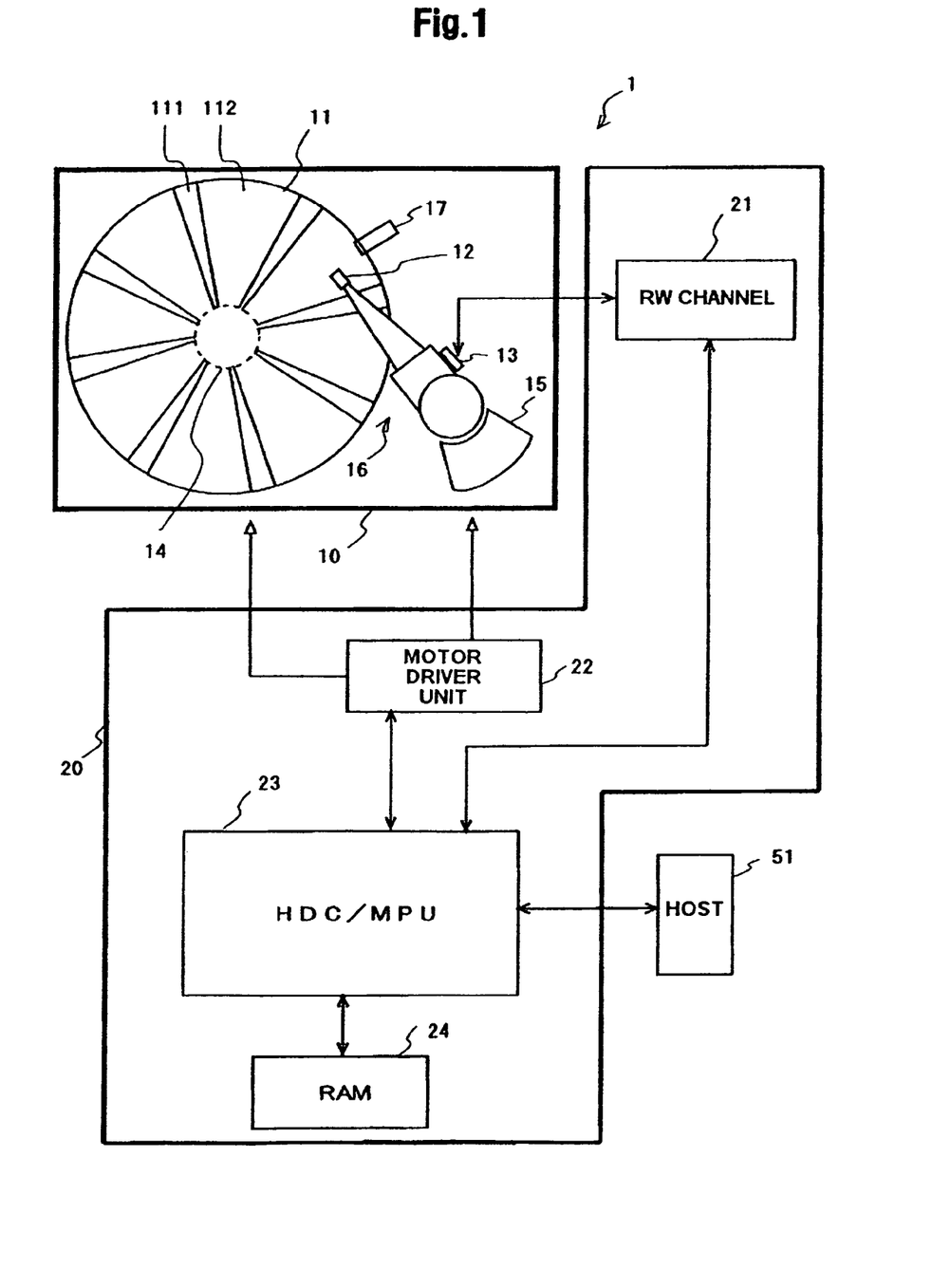
FIG. 1 is a block diagram schematically illustrating an entire configuration of an HDD in one embodiment.

First, an entire configuration of an HDD is outlined referring to FIG. 1. A circuit board 20 is fixed outside an enclosure 10. On the circuit board 20, circuits such as a read-write channel (RW channel) 21, a motor driver unit 22, an integrated circuit (HDC/MPU) 23 of a hard disk controller (HDC) and an MPU, and a RAM 24 are mounted. In the enclosure 10, a spindle motor (SPM) 14 rotates a magnetic disk 11 at a specific angular rate. The magnetic disk 11 is a disk for storing data. The motor driver unit 22 drives the SPM 14 in accordance with control data from the HDC/MPU 23.

On the recording surface of the magnetic disk 11, a plurality of servo areas 111 extending radially in the radial direction from the center of the magnetic disk 11 at every specific angle and data areas 112 between the adjoining two servo areas 111 are formed. In each servo area 111, servo data for controlling positioning of the head slider 12 are recorded. In each data area 112, user data are recorded. The user data and the servo data are recorded on concentric data tracks and servo tracks, respectively.

A head slider 12, an example of a head, includes a slider and a head element portion for accessing the magnetic disk 11, and flies above the magnetic disk. The access is a data read or a data write. The head slider 12 according to one embodiment includes a heater which makes the head element portion expand and protrude by heat for thermal fly-height control (TFC) to adjust the clearance between the head element portion and the magnetic disk 11. This heater is a heating element to supply heat to the head slider 12 and also adjusts the clearance between the head element portion and the magnetic disk 11. FIG. 1 shows one head slider 12 but the HDD 1 may have one or more head sliders 12.

The head slider 12 is fixed to a tip end of an actuator 16. The actuator 16, which is coupled to a voice coil motor (VCM) 15, pivots about a pivotal shaft to move the head slider 12 above the magnetic disk 11 in its radial direction. The actuator 16 is a moving mechanism supporting the head slider 12. The actuator 16 stays on a ramp 17 while the SPM 14 is at rest or during a low power consumption mode. The ramp 17 is located in the vicinity of the outer circumferential end of the magnetic disk 11 and the tip end of the actuator 16 slides thereon. When the actuator 16 is on the ramp 17, the head slider 12 is positioned away from the magnetic disk 11. The HDD having such a structure is called an HDD employing the ramp load/unload scheme. The ramp 17 may be arranged in the vicinity of the inner circumferential edge of the magnetic disk 11.

The motor driver unit 22 drives the VCM 15 in accordance with control data from the HDC/MPU 23. An arm electronics (AE) 13 selects a head slider 12 to access (read or write) the magnetic disk 11 from a plurality of head sliders 12 in accordance with control data from the HDC/MPU 23 and amplifies read/write signals. The AE 13 also supplies the heater of the head slider 12 selected in accordance with the control data from the HDC/MPU 23 with electric power (electric current) and adjusts the electric energy.

The RW channel 21, in read operation, extracts data from read signals supplied from the AE 13 to perform a decoding process. The decoded data are supplied to the HDC/MPU 23. The RW channel 21, in write operation, code-modulates write data supplied from the HDC/MPU 23 and further converts the code-modulated data into write signals to supply them to the AE 13.

The HDC/MPU 23, an example of a controller, performs entire control of the HDD 1 in addition to necessary processes concerning data processing such as read/write operation control, command execution order management, positioning control of the head slider 12 using servo signals (servo control), interface control to and from a host 51, defect management, and error handling operations. The HDC/MPU 23 according to the present embodiment performs TFC using the heater on the head slider 12 and removes the adhesion on the head slider utilizing the heater. This adhesion removal will be described in detail later.

Figure 2:
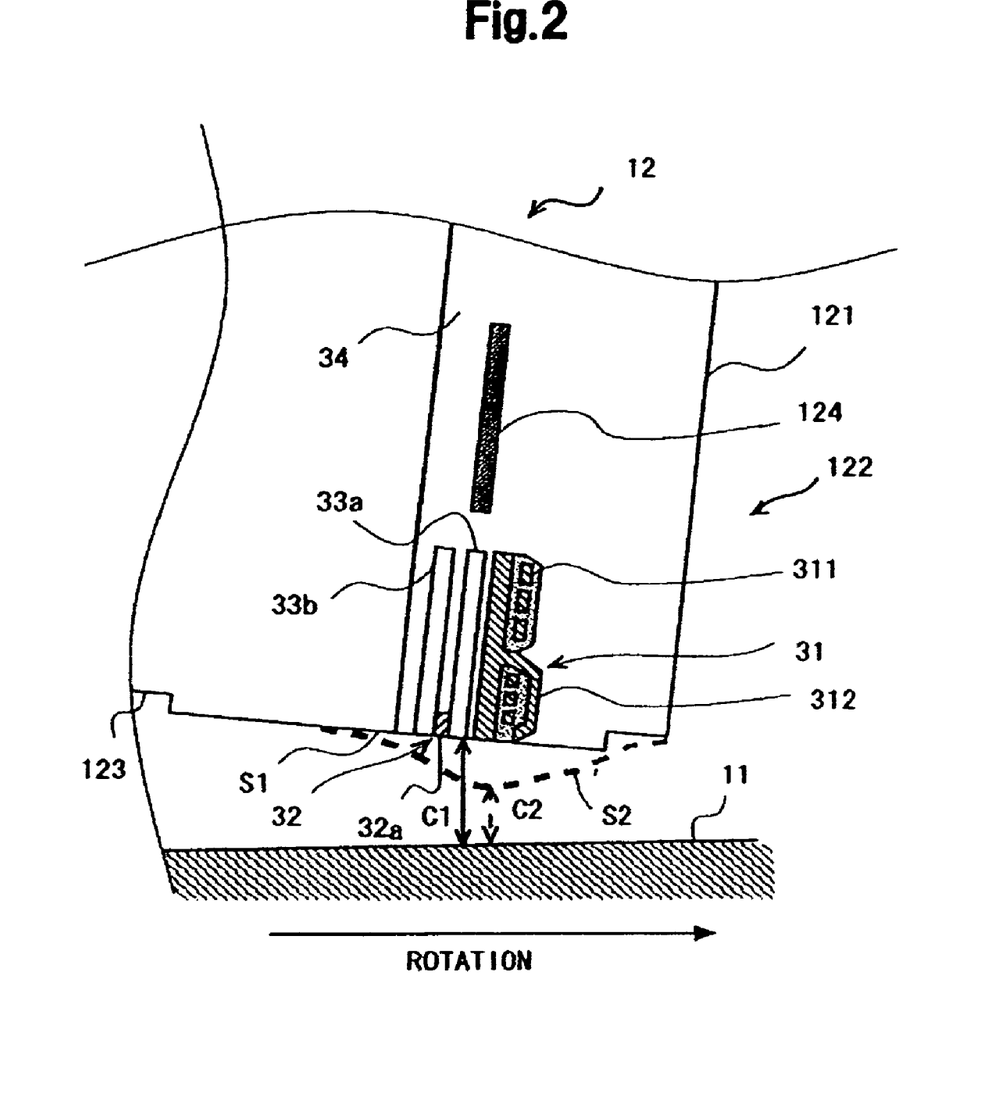
FIG. 2 is a cross-sectional view schematically illustrating a configuration of a head slider equipped with a heater for TFC in one embodiment.

FIG. 2 is a cross-sectional view schematically illustrating a configuration in the vicinity of air flowing end surface (trailing side end surface) 121 of the head slider 12 of one embodiment. A head element portion 122 on a slider 123 comprises a read element 32, a write element 31, and a protective film thereof 34. The write element 31 generates magnetic fields between magnetic poles 312 by means of electric current flowing across a write coil 311 to record magnetic data onto the magnetic disk 11. The read element 32 has a magnetoresistive element 32a having magnetic anisotropy and retrieves magnetic data by means of resistance varying with magnetic fields from the magnetic disk 11. The magnetoresistive element 32a is sandwiched between magnetic shields 33a and 33b.

A heater 124 is formed in the vicinity of the write element 31 and the read element 32. The heater 124 may be formed of a thin film resistive element using permalloy, for example. When the AE 13 supplies the heater 124 with electric power, the head element portion 122 and the vicinity thereof are deformed to protrude due to the heat of the heater 124. For example, in non-heating of the heater 124, the shape of the ABS of the head slider 12 is indicated by S1 and the clearance between the head element portion 122 and the magnetic disk is indicated by C1. The protruding shape S2 in heating the heater 124 is illustrated by a broken line. The head element portion 122 comes close to the magnetic disk 11 and the clearance C2 is smaller than the clearance C1. FIG. 2 is a conceptual view and its dimensions are not rigidly defined. The protruding amount of the head element portion 122, or the clearance between the head element portion 122 and the magnetic disk 11, varies in accordance with the heater power supplied to the heater 124.

The HDD 1 of the present embodiment heats the head slider 12 to remove the substances deposited thereon. The HDD 1 of the present embodiment is an HDD employing the ramp load/unload scheme, when the power is off or there is no access to the magnetic disk 11, it withdraws the actuator 16 off the magnetic disk 11 onto the ramp 17. While the actuator 16 stays on the ramp, the HDD 1 heats the head slider 12 with the heater 124. The adhesion, formed mainly of organic materials; melts as the surface temperature of the head slider 12 rises, and then vaporizes at higher temperature. In the present specification, the action of the actuator 16 (the head slider 12) to move from the ramp 17 to the magnetic disk 11 is referred to as loading, its action to move from the magnetic disk 11 to the ramp 17 is referred to as unloading.

Figure 3:
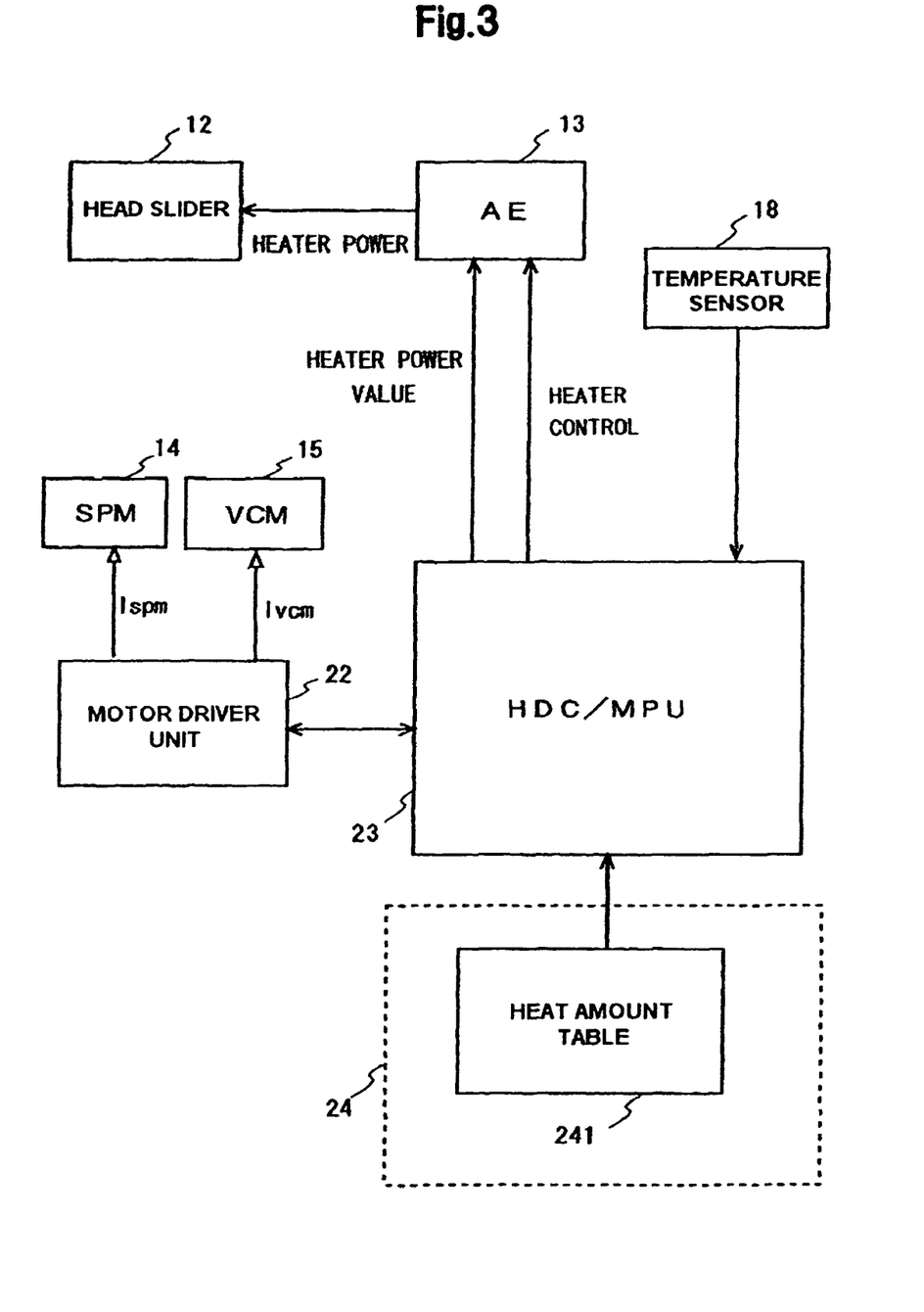
FIG. 3 is a block diagram schematically illustrating a preferred example of logic components for removing adhesion on a head slider in one embodiment.

There are some methods for removing the adhesion from the head slider 12. One of them is to vaporize the adhesion on the head slider 12. Another one is to blow off the adhesion from the head slider 12 or to transfer the adhesion onto another member after melting the adhesion or decreasing its viscosity. FIG. 3 is a block diagram schematically illustrating a preferred configuration of the logic components for removing the adhesion on the head slider 12.

The HDC/MPU 23 sets control data to a register in the motor driver unit 22 and controls the VCM current lvcm and the motion of the VCM 15 to move the actuator 16 to a desired position. When the actuator 16 is on the ramp 17, the HDC/MPU 23 controls the heater 124 to heat the head slider 12. Specifically, the HDC/MPU 23 sets data indicating heater power, HEATER POWER VALUE, to a register in the AE 13; and the AE 13 supplies the heater 124 with electric power according to the data. The AE 13 starts or stops the supply of electric power to the heater 124 in accordance with control signals from the HDC/MPU 23, HEATER CONTROL.

Since the actuator 16 is positioned on the ramp 17, the head slider 12 is away from the surface of the magnetic disk 11, and the ramp is sufficiently away from the head slider 12 so that the heat conductance can be ignored, the heat does not substantially escape from the surface of the head slider 12 so that the surface temperature of the head slider 12 can be efficiently raised by the heater 124. Preferably, the HDC/MPU 23 heats the head slider 12 while the actuator 16 stays on the ramp 17, the head slider 12 is away from the magnetic disk 11, and the head slider 12 does not overlap the disk when viewed in the direction parallel to the rotational shaft. This enables the surface temperature of the head slider 12 to rise effectively and further prevents noise generated by the movement of the actuator 16.

In order to vaporize the adhesion from the head slider 12, it is preferable to raise the surface temperature of the head slider 12 as high as possible. This is because the adhesion contains some kinds of organic materials and they have different melting points and evaporation temperatures depending on the materials. However, if the temperature of the head slider 12 is too high, it damages the head element portion 122 to reduce the reliability. Accordingly, it is necessary to properly control the temperature of the head slider 12 and to vaporize the adhesion on the head slider 12 without damaging the head element portion 122.

The HDC/MPU 23 controls the amount of heat to be added for the adhesion removal depending on the condition of the head slider 12. The amount of heat is one of the heating conditions of the head slider 12. The HDC/MPU 23 can adjust the amount of heat by the heater power and the energizing time of the heater 124. The temperature of the head slider 12 varies with the temperature in the enclosure 10. Therefore, it is preferable to adjust the amount of heat to the head slider 12 depending on the temperature. The temperature is a state of condition of the head.

Figure 4:
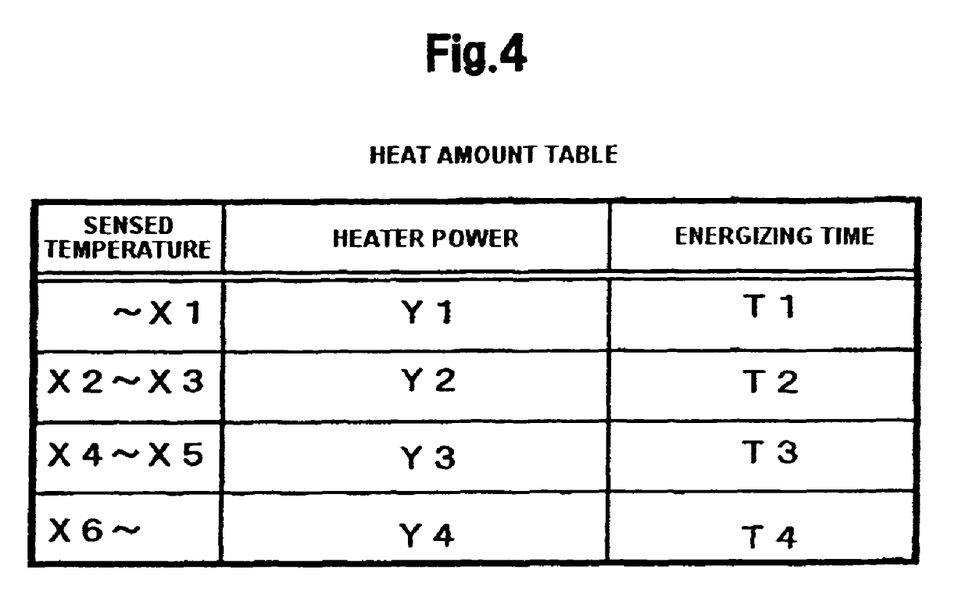
FIG. 4 is a drawing schematically showing an example of a heat amount table according to one embodiment.

The HDD 1 of the present embodiment has a temperature sensor 18 inside the enclosure 10. The HDC/MPU 23 determines the amount of heat to be added to the heater 124 based on the sensed temperature by the temperature sensor 18. The amount of heat is represented by heater power, energizing time, and the like. The environmental temperature is condition in which the head slider 12 is placed, that is, a state of the condition of the head. The HDD 1 stores a heat amount table 241 relating the condition of the head slider to the amount of heat in itself in its manufacturing steps. FIG. 4 is an example of the heat amount table which associates the sensed temperature with the amount of heat. The HDC/MPU 23 refers to the heat amount table 241 to determine the heater power and the energizing time corresponding to the sensed temperature. As the sensed temperature increases, the amount of heat decreases. For example, the amount of heat is set so as to decrease in a staircase pattern or continuously with increase in the sensed temperature.

Instead of using the heat amount table 241, the amount of heat maybe determined by using a mathematical formula. The HDD 1 may be equipped with the temperature sensor 18 outside the enclosure 10. The HDD 1 may determine the temperature with an element other than the temperature sensor 18, such as resistance in the head element portion 122. That is to say, the temperature of the condition of the head includes the temperature of the head itself and the temperatures inside and outside the enclosure 10.

The HDC/MPU 23 may energize the heater 12 while the magnetic disk 11 is rotating. The rotation of the magnetic disk 11 generates air current which facilitates vaporization of the adhesion on the head slider 12. Or, it may heat the head slider 12 to a temperature lower than the temperature for the purpose of the vaporization of the adhesion and blow off the adhesion from the head slider 12 by the air current generated by the rotating magnetic disk 11. The air current generated by the rotating magnetic disk 11 is a state of condition of the head.

The HDC/MPU 23 sets control data to a register in the motor driver unit 22 to control the rotation of the SPM 14. Or, the motor driver unit 22 can sense the angular rate of the SPM 14 so that the HDC/MPU 23 can know the rotational state of the magnetic disk 11. For example, the HDC/MPU 23 heats the head slider 12 for removing the adhesion in the power-on operation of the HDD 1 after the rotation of the magnetic disk 11 has started. Or, it may heat the head slider 12 while the magnetic disk 11 is still rotating immediately after unloading.

The HDC/MPU 23 may adjust the amount of heat to the head slider 12 in accordance with the rotational state of the magnetic disk 11. The rotational state of the magnetic disk 11 is condition in which the head slider 12 is placed, namely, a state of condition of the head. For example, the HDC/MPU 23 varies the amount of heat depending on whether or not the magnetic disk 11 is rotating. Or, the HDC/MPU 23 varies the amount of heat depending on the angular rate of the magnetic disk 11. The HDC/MPU 23 may adjust the rotational speed of the magnetic disk 11 to facilitate the adhesion removal.

For example, if the surface temperature of the head slider 12 possibly drops due to the air current caused by the rotation of the magnetic disk 11, the amount of heat may be increased to facilitate the adhesion removal for the rotation of the magnetic disk 11 or may be increased with increase in rotational speed of the magnetic disk 11. Or, in order to improve the reliability, the amount of heat may be set smaller in the case that the magnetic disk 11 is rotating than the case that the magnetic disk 11 is not rotating.

Although the HDC/MPU 23 may adjust the amount of heat based on only the rotation of the magnetic disk 11, it may determine the amount of heat in accordance with two parameters of the temperature sensed by the temperature sensor 18 and the rotation of the magnetic disk 11. The HDC/MPU 23 determines the amount of heat, namely the heater power and the energizing time, for the sensed temperature and the rotation of the magnetic disk 11, in accordance with the control data preset in the heat amount table 241 or the specific mathematic formula.

In order to improve the reliability, the HDC/MPU 23 may heat the head slider 12 in need of adhesion removal at the timing necessary for adhesion removal. The timing of heating is one of the heating conditions. A typical HDD comprises multiple head sliders as exemplified in FIG. 5. The head sliders 12 have different conditions. Therefore, it is preferable that the HDC/MPU 23 determine the heating condition for each head slider.

Figure 5:
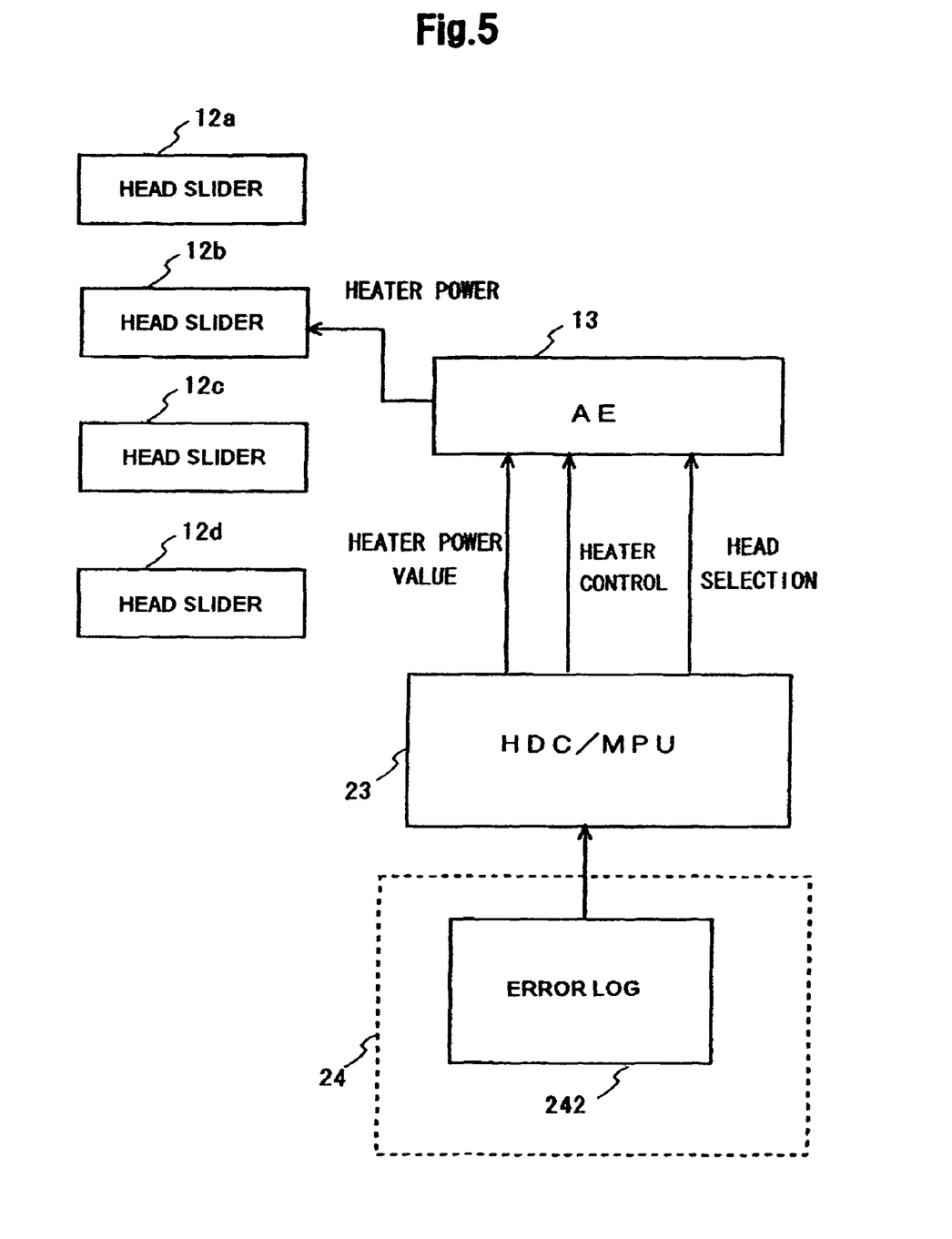
FIG. 5 is a block diagram schematically illustrating another preferred example of logic components for removing adhesion on a head slider in one embodiment.

FIG. 5 exemplifies four head sliders 12*a* to 12*d* each corresponding to a recording surface of a magnetic disk 11. The head sliders 12*a* to 12*d* are aligned in the direction of the rotational shaft of magnetic disks 11; the head slider 12*a* is the top end head slider and the head slider 12*d* is the bottom end head slider. Typically, each of the head sliders 12*a* and 12*d* is located between the inner wall of the enclosure 10 and a recording surface of a magnetic disk 11; each of the head sliders 12*b* and 12*c* is located between recording surfaces of magnetic disks 11. The number of magnetic disks 11 and head sliders 12, and the alignment of the head sliders 12 are selected as appropriate depending on the design.

Frequent heating operations leads to degradation of the reliability of the head sliders 12. Accordingly, the HDC/MPU 23 preferably determines the heating timing depending on the alignment position of the head. The alignment position of the head is a state of condition of the head and the heating timing is one of the heating conditions. The amount of heat at each timing is also determined depending on the alignment position. Therefore, the AE 13 of the heads selects a head slider 12 in accordance with the head selection signal HEAD SELECTION from the HDC/MPU 23 and supplies the heater 124 of the selected head slider 12 with electric power. In one example, the HDC/MPU 23 determines the timing of heating and/or the amount of heat for adhesion removal corresponding to the error status of the head slider 12. The error status is a state of condition of the head. Specifically, the HDC/MPU 23 refers to an error log 242 on each of the head sliders 12*a* to 12*d*, and if any error log exceeds the criteria, it heats the head slider to remove the adhesion.

For example, the HDC/MPU 23 records read errors and/or write errors caused by the head sliders 12*a* to 12*d*. If the number of read errors and/or write errors of a specific head slider 12 exceeds a reference value, the HDC/MPU 23 executes a heating operation of the head slider 12. The HDC/MPU 23 can perform the heating operation at any timing of these: during the initial setting in response to the power-on, at the timing immediately after the unloading, at the timing immediately before the loading, or the like.

The HDC/MPU 23 may determine the execution timing of heating operation for adhesion removal depending on the kind of the errors. For example, the HDC/MPU 23 refers to only the write errors caused by a head slider 12; and if the number of errors exceeds a reference value, it executes a heating operation for adhesion removal. Or, the HDC/MPU 23 may refer to both the number of write errors and the number of read errors; and in addition, may use different reference values for those of them. It may also change the reference value or the kind of error to be referred to depending on the alignment position of the head slider 12. The determination of the heating operation with referring to the error log is applicable to an HDD 1 equipped with only one head slider 12.

In one example, if the error frequency in the head slider 12 exceeds the reference value after the above heating operation has been performed, the HDC/MPU 23 supplies a larger amount of heat to the head slider 12 in the next heating operation than in the previous operation. This is because the amount of heat in the previous heating operation was not enough and the adhesion still remains on the head slider 12. For example, if the number of accesses is smaller than a specific reference value from a previous heating operation to the present heating operation performed on condition that the number of specific errors has reached the reference value after the previous heating operation, the HDC/MPU 23 supplies the head slider 12 with a larger amount of beat than in the previous operation. Or, if a specific error occurs within a reference number of accesses immediately after the heating operation, the HDC/MPU 23 may perform another heating operation for adhesion removal with a larger amount of heat than in the previous operation.

In another example, the HDD 1 may perform the above heating operation at a specific timing regardless of the error statuses of the head sliders 12a to 12d. For example, in every initial setting in response to the power-on, or when the operation time of the HDD 1 exceeds a reference time, it may perform the above heating operation. In these cases, it is preferable that the HDC/MPU 23 determine the timing of the above heating operation depending on their aligned positions in the condition of the head sliders 12a to 12d. Specifically, the heating frequencies to the top end head slider 12a and the bottom end head slider 12d should be larger than to the other head sliders 12a and 12d. This is because these head sliders 12b and 12c have more probability that contaminants may deposit thereon to cause errors than the other head sliders 12b and 12c.

In summary of the above, in certain embodiments the temperature such as the environmental temperature around the head and the temperature of the head itself, the rotation of the magnetic disk, the alignment position of the head, the error status determined based on an error log on the head, the state that the head has been used for more than the reference time, and the like have been listed as the states of condition of the head. The amount of heat and the timings of heating are listed as the heating conditions. However, the condition of the head and the heating conditions are not limited only to the embodiment but may be considered in various ways. Further, the heating conditions may be determined by combining a plurality of states of condition of the head. In this case, the heat amount table shown in FIG. 4 will be more complicated.

In the above-described operations, the HDD 1 heats the head sliders 12 while the actuator 16 stays on the ramp 17. In another embodiment, the HDD 1 heats the head sliders 12 to lower the viscosity of the adhesion, and then transfers the adhesion onto another component. This achieves effective removal of adhesion on the head slider 12 at a lower heating temperature. The component to which the adhesion on the head slider 12 is to be transferred may be the magnetic disk 11.

However, it is difficult to raise the surface temperature of the head slider 12 which is positioned above the magnetic disk 11. Then, the HDD 1 according to one embodiment starts to energize the heater 124 in a state that the actuator 16 is positioned above the ramp 17 and performs a loading operation with maintaining the energized state. Or, the HDD 1 may start to move the actuator 16 toward the magnetic disk 11 for loading upon power-off of the heater 124, or it may turn off the heater 124 while the actuator 16 is sliding on the ramp 17 in loading.

Figure 6A:
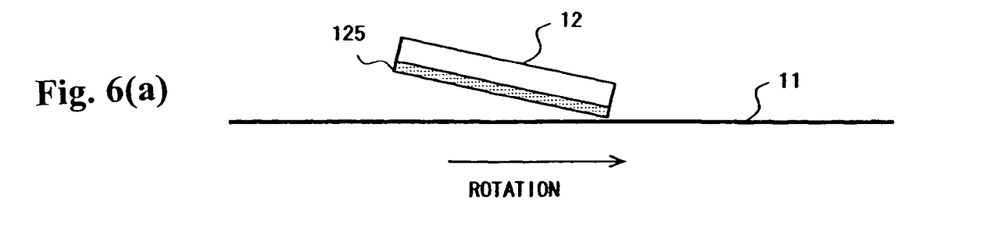
FIGS. 6(a)-6(d) are drawings illustrating a method for removing adhesion on the head slider by transferring the adhesion onto a magnetic disk in one embodiment.
Figure 6B:
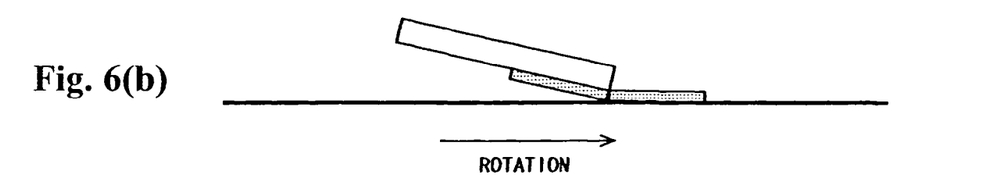
Figure 6C:
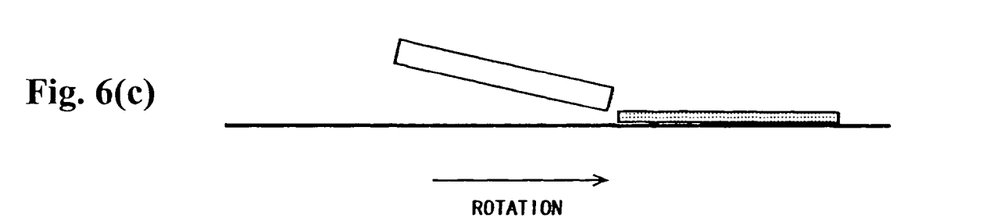

As shown in FIGS. 6(a) to 6(c), adhesion 125 on a head slider 12 starts to be transferred onto a magnetic disk 11 upon loading and the adhesion 125 is gradually transferred onto the magnetic disk 11 with rotation of the magnetic disk 11. The surface temperature of the head slider 12 drops after the head slider 12 has been loaded to above the magnetic disk 11, but the viscosity of the adhesion 125 does not decrease immediately so that the adhesion 125 can be transferred from the ABS of the head slider 12 to the surface of the magnetic disk 11.

Figure 6D:
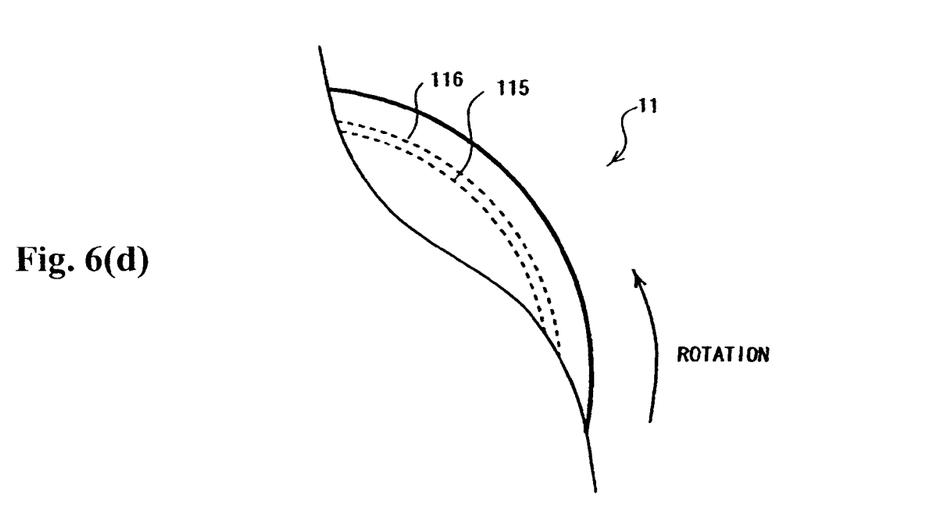

It is important that the transferred adhesion 125 should not interfere with retrieving recorded data (including servo data and user data) from the magnetic disk 11 or writing data to the magnetic disk 11. As shown in FIG. 6(d), the outer circumferential end 115 of the recording area of user data on the recording surface is located inner than the physical outer circumferential end of the magnetic disk 11. And typically, the outer circumferential end 116 of the recording area of servo data is located between the physical outer circumferential end of the magnetic disk 11 and the outer circumferential end 115 of the recording area of user data.

In order to avoid interference with retrieving and writing user data, it is preferable to transfer the adhesion 125 in the area more outward of the outer circumferential end 115 of the recording area of user data. Moreover, in order to avoid interference with head positioning, it is preferable to transfer the adhesion 125 in the area more outward of the outer circumferential end 116 of the recording area of servo data. Since transfer of the adhesion 125 from the head slider 12 to the magnetic disk 11 does not require a long time, typically the transfer of the adhesion 125 ends before the head slider 12 reaches the outer circumferential end 116 of the servo data area in a normal loading operation in which the transfer is not intended.

However, from the view point of the reliability, in loading with removal of the adhesion 125 using the heater 124, it is preferable that the time for the head slider 12 to reach the outer circumferential end of the user data area 115 or the outer circumferential end of the servo data area 116 after coming down above the magnetic disk 11 be longer than the time in a normal loading in which the heater 124 is off on the ramp 17. Specifically, the HDC/MPU 23 performs a following operation on a specific servo track for a longer time after the head slider 12 has retrieved the servo data on the magnetic disk 11. Or, the HDC/MPU 23 moves the actuator 16 toward the inner circumference on the magnetic disk 11 at a slower speed. In this way, setting the time for transferring the adhesion on the area outer than the outer circumferential end of the user data 115 or the outer circumferential end of the servo data 116 leads to improving the reliability.

As set forth above, the present invention has been described by way of example of particular embodiments, but is not limited to the above embodiments. A person skilled in the art can easily modify, add, or convert the components in the above embodiments within the scope of the present invention. For example, embodiments of the present invention may be applied to a disk drive device other than an HDD. In another example, the write element may be used as a heating element. The head slider may have only either one of a read element or a write element.

What is claimed is:

1. A disk drive device comprising:
 a disk for storing data;
 a head having a reproducing element, a recording element, and a heating element;

a moving mechanism for supporting and moving the head;
a ramp onto which the moving mechanism is withdrawn;
a temperature sensor; and
a controller coupled to the temperature sensor and being configured to control the heating element in response to the temperature sensor to heat the surface of the head for removing an adhesion on the surface of the head, when the moving mechanism stays on the ramp in accordance with a heating condition or a condition of the head.

2. The disk drive device according to claim 1, wherein
the condition of the head includes an error status determined based on an error log on the head; and
the heating condition includes a heating timing and/or the amount of heat to the head.

3. The disk drive device according to claim 1, wherein
the condition of the head includes elapsed time after a previous heating of the head positioned on the ramp; and
the heating condition includes a heating timing to the head.

4. The disk drive device according to claim 1, wherein
the condition of the head includes the temperature of the head; and
the heating condition includes the amount of heat to the head.

5. The disk drive device according to claim 1, wherein
the moving mechanism supports multiple heads aligned in the direction parallel to a rotational shaft of the disk;
the condition of each head includes an alignment position of the head; and
the heating condition includes a heating timing and/or the amount of heat to the head.

6. The disk drive device according to claim 1, wherein
the controller controls the heating element to heat the head while the disk is rotating.

7. The disk drive device according to claim 6, wherein
the condition of the head includes rotation of the disk; and
the heating condition includes the amount of heat to the head.

8. The disk drive device according to claim 1, wherein
the controller controls the heating element to adjust the clearance between the head and the disk.

9. The disk drive device according to claim 1, wherein the controller controls the heated head to be loaded above the disk with the moving mechanism and to transfer adhesion on the head onto the disk.

10. A method for removing adhesion on a head in a disk drive device employing the load/unload scheme comprising:
monitoring the environmental temperature of the disk drive device;
determining a heating condition of the head depending on the monitored environmental temperature and a condition of the head; and
heating the surface the head with a heating element on the head in accordance with the heating condition for removing an adhesion on the surface of the head when a moving mechanism for supporting and moving the head stays on a ramp.

11. The method according to claim 10, wherein
the condition of the head includes an error status determined based on an error log on the head; and
the heating condition includes a heating timing and/or the amount of heat to the head.

12. The method according to claim 10, wherein
the condition of the head includes an operating time after heating of the head; and
the heating condition includes a heating timing to the head.

13. The method according to claim 10, wherein
the condition of the head includes the temperature of the head; and
the heating condition includes the amount of heat to the head.

14. The method according to claim 10, wherein
the moving mechanism supports multiple heads aligned in the direction parallel to a rotational shaft of the disk;
the condition of each head includes an alignment position of the head; and
the heating condition includes a heating timing and/or the amount of heat to the head.

15. The method according to claim 10, wherein
a controller controls the heating element to heat the head while the disk is rotating.

16. The method according to claim 15, wherein
the condition of the head includes rotation of the disk; and
the heating condition includes the amount of heat to the head.

17. The method according to claim 10, wherein
the controller controls the heating element to adjust the clearance between the head and the disk.

18. The method according to claim 10, further comprising:
loading the head above the disk with the moving mechanism after start of heating the head and transferring adhesion on the head onto the disk.

* * * * *